July 21, 1959 W. R. LEOPOLD, JR 2,895,766
BALANCING DEVICE
Filed March 6, 1956 3 Sheets-Sheet 2
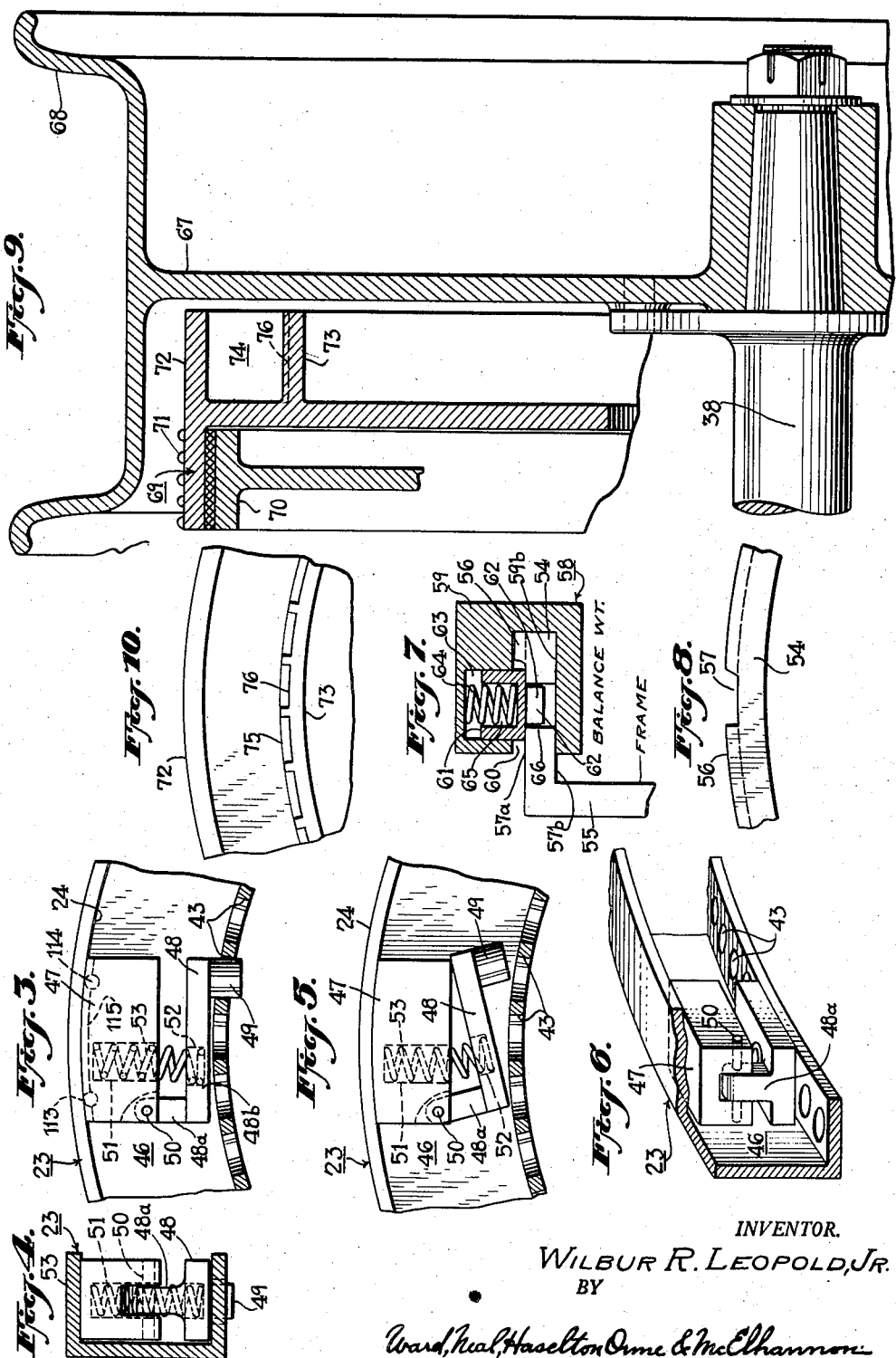
INVENTOR.
WILBUR R. LEOPOLD, JR.
BY
Ward, Neal, Haselton Orme & McElhannon
HIS ATTORNEYS.

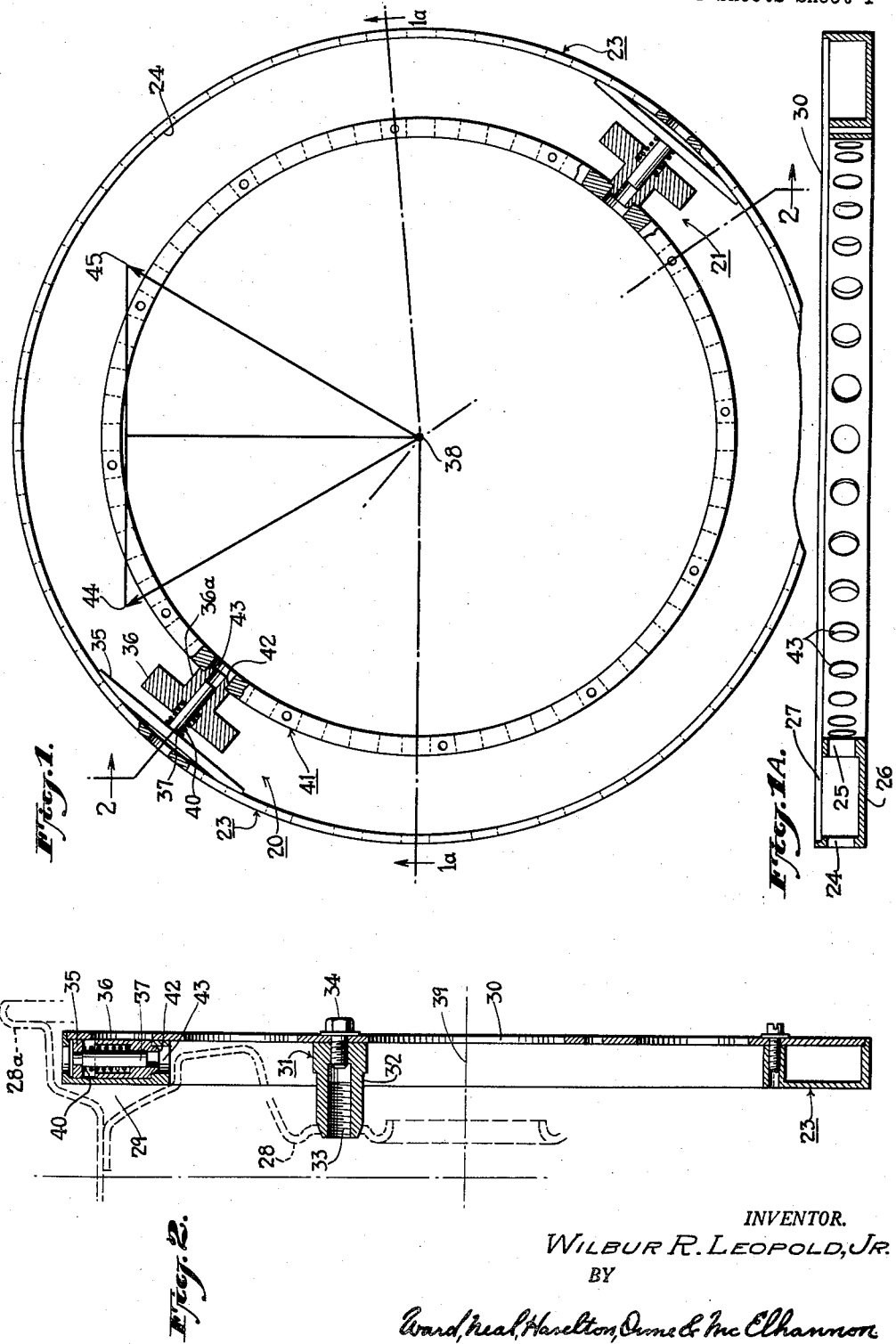

July 21, 1959
W. R. LEOPOLD, JR
2,895,766
BALANCING DEVICE
Filed March 6, 1956
3 Sheets-Sheet 3
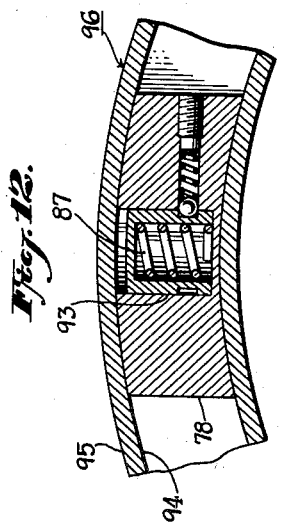
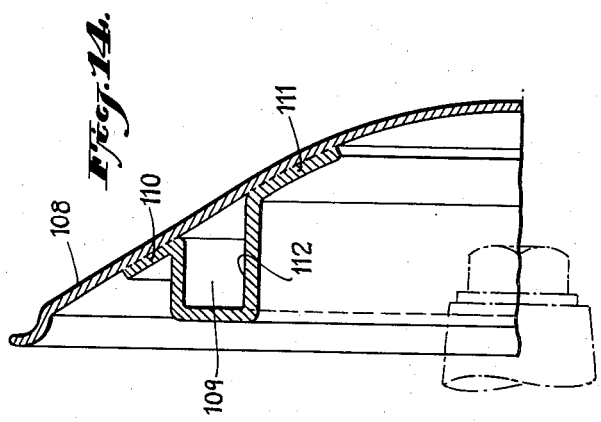
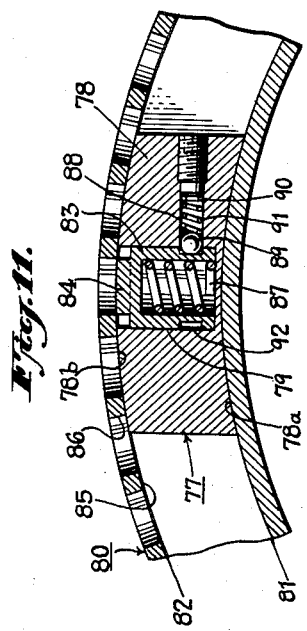
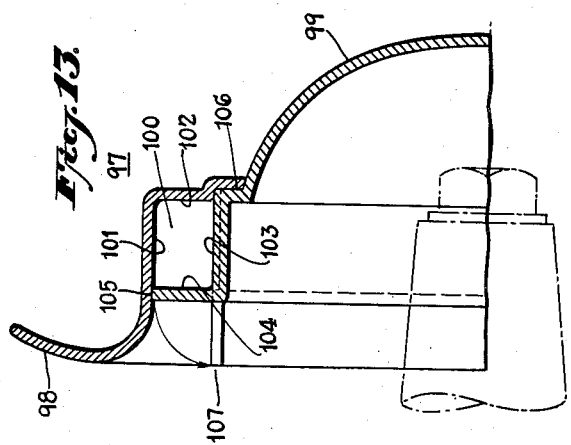
INVENTOR.
WILBUR R. LEOPOLD, JR.
BY
Ward, Neal, Haselton, Orrick & McElhannon
HIS ATTORNEYS.

United States Patent Office 2,895,766
Patented July 21, 1959

2,895,766

BALANCING DEVICE

Wilbur R. Leopold, Jr., Ridgewood, N.J., assignor to Mechanical Controls Inc., New Rochelle, N.Y., a corporation of New York Application March 6, 1956, Serial No. 569,747

13 Claims. (Cl. 301—5)

This invention relates to balancing means, and more particularly to improvements in means for automatically damping or reducing the vibrations of rotating bodies.

One of the objects of the present invention is to provide novel means for overcoming imbalance in a rotating body, such as a vehicle wheel, which means are automatic in operation and which are not adversely affected at any speed by external buffeting forces, such as violent road shock.

Another object is to provide a novel balancing means of the above character which is well adapted for being permanently secured to a rotating body which, together with the mounting therefor, is to be balanced, such balancing means occupying a very small volume and being easily adapted to occupy convenient locations upon such a rotating body, for example, adjacent the brake drum of a vehicle wheel, or in the interior of a hub cap for such a wheel.

A still further object resides in the provision of novel means of the above character employing centrifugally actuated means for automatically releasing balancing weights for movement in an annular path whereby the weights are operative to balance the rotating body when a selected angular velocity of such body occurs.

A further object is to provide a novel device of this character which is of light weight.

A still further object is to provide centrifugally actuated means aforementioned which release the balancing weights at such selected angular velocity and which, below such angular velocity, are effective positively to lock such weights in a fixed position with respect to the rotating body which is undergoing balancing.

Another object is to provide a balancing device for a rotating body employing novel means for locking in position the balancing weights for such rotatable body.

The present invention, in one aspect thereof, comprises a balancing device for a rotatable body, which device employs an annular track means coaxial with the axis of rotation of said body. The track means is provided with a detent surface angularly coextensive therewith in which are formed a plurality of recesses. A plurality of balance weight elements, preferably two, are guided and/or carried by said annular track means and each of such balance weight elements includes a subelement mounted thereon for movement relative thereto in response to centrifugal force. Such subelement in turn is provided with a detent finger positioned for engaging the aforementioned detent surface. It is desirable for the median plane of the annular track means to be normal to the axis of rotation and as close as practicable to the center of mass of the rotating body. Resilient means act upon such subelement and thus the detent finger thereof for urging same toward said detent surface. In response to the occurrence of a rotational speed slightly above the critical rotational speed of said body, each subelement, under the influence of centrifugal force, is capable of overcoming its resilient means and thus causing the disengagement of its detent finger with said detent surface thereby freeing the balance weight for movement as guided by the annular track means whereby the balance weight element or elements can take position as demanded by the natural forces existing thereby to balance the rotating body. The freeing of such balance weights for movement when such critical speed has been so exceeded, of course, permits such weights to seek the light side of the axis of rotation of the rotatable body and thereby to effect a balance thereof. After the balance weights have positioned themselves under the influence of the natural forces existing above critical speed, the speed can be reduced, whereupon the detent means will become effective to lock positively the balance weights in position for maintaining the balance in a positive manner below the aforementioned critical speed.

Various other objects, features and advantages of the invention will clearly appear from the detailed description given below taken in connection with the accompanying drawings which form a part of the specificiaton and illustrate, by way of example, several forms of apparatus which may be employed in carrying out the invention. The invention resides in such novel features, arrangements and combinations of parts as may be shown and described in connection with the apparatus herein disclosed.

In the drawings:

Fig. 1 is a side elevation, partly in section and with parts broken away, of one form of apparatus embodying the present invention;

Fig. 1a is a sectional view taken along line 1a—1a of Fig. 1;

Fig. 2 is a sectional view taken substantially along line 2—2 of Fig. 1 and showing the balancing apparatus embodying the present invention in combination with a vehicle wheel illustratively of the automobile variety;

Fig. 3 is a fragmentary view in side elevation, partly in section and also with parts broken away, of a second embodiment of the present invention;

Fig. 4 is an end view of the parts shown in Fig. 3;

Fig. 5 is a side view of the parts shown in Fig. 3 but in a different operating position wherein a counter-balance weight element is released for movement as guided by the annular guide element therefor;

Fig. 6 is a perspective view of the parts shown in Fig. 3;

Fig. 7 is an end view in fragmentary form, also partly in section and with parts broken away, of a third form of the invention;

Fig. 8 is a side elevation of a fragmentary portion of a guide element as employed in the embodiment of Fig. 7;

Fig. 9 is a view, partly in section and with parts broken away, of a fragmentary portion of a vehicle wheel of the automobile type in combination with a brake drum therefor showing the location of the novel apparatus embodying the present invention therewith;

Fig. 10 is a fragmentary view in side elevation of a portion of the annular guide element for guiding the balance weights as shown in Fig. 9;

Fig. 11 is a side elevation again of a fragmentary portion of a fourth embodiment of the present invention;

Fig. 12 is a view illustrating a modification of the invention shown in Fig. 11;

Fig. 13 is a vertical sectional view, partly in section and with parts broken away, of a hub cap for an automobile wheel adapted for association with the balancing means embodying the present invention; and Fig. 14 is a vertical sectional view, also partly in section and with parts broken away, of another form of hub cap with which is associated the aforementioned apparatus embodying the present invention.

The automatic balancing apparatus comprising the present invention is based in operation upon the well known principle to the effect that when a rotatable body is rotating below its critical speed (that is below the natural frequency of the system), if it is out of balance the heavy side thereof will swing outwardly in a circle about the axis of the bearings therefor; and when rotating above such critical speed that portion of the aforementioned annular track means coincident with the light side of the rotating body is further from the center of rotation than the opposite side. Also, the well known principle in mechanical vibrations is noted to the effect that the forced vibration always lags behind the disturbing force. When below critical speed the angular difference is small; at critical speed the angle between them is $\pi/2$ radians; and above critical such angle becomes $\pi$.

The term "critical speed" as employed herein refers to the number of revolutions per unit time which corresponds to the natural or resonant frequency of the mass which is being rotated.

Referring to the drawings in greater detail, with particular reference to Figs. 1, 1a and 2, a balancing device for automatically balancing a rotating body, such as a vehicle wheel, is shown which employs the aforementioned principles. Such novel apparatus is adapted for being built into and for forming a permanent part of the rotating body, such as the vehicle wheel, to the end that independent balancing means is no longer required therefor, and whereby by a very simple means the rotating body or vehicle wheel can be balanced at any time where it exceeds a selected rotational speed as will be set forth hereinbelow. By means of this novel apparatus automatic balancing and rebalancing of the rotating body can occur indefinitely once it is affixed thereto without the need for skilled balancing machine operators. It is, of course, understood that the automatic rebalancing occurs as the result of repositioning of the balance or counterbalance weights which occurs when the rotating body slightly exceeds the selected critical speed. Below the selected speed the balance weights (also referred to herein as balance weight elements) are positively locked to an annular guide therefor as will be set forth hereinbelow.

Referring to Fig. 1, the novel apparatus comprises two such balance weight elements (or counterbalance weights) 20 and 21 which are constrained to move in a circular or annular path by means of a circular track or race 23 having an outer flange 24 and inner flange 25 and side flanges 26 and 27.

The circular track or race 23 is, in the form shown in Figs. 1, 1a and 2, adapted for use with, for example, the front wheel supporting assembly of an automotive vehicle having a front wheel 28 which, in the particular form shown in Fig. 2, is conformed for the purpose of receiving the counterbalance apparatus embodying the present invention in that it is provided with a suitable annular recess 29 on the outer portion thereof for receiving the annular track or race 23. The novel apparatus is secured to the wheel 28 by means of a disc 30, the outer margin of which comprises the aforementioned flange 27, the disc 30 having associated therewith suitable fastening means 31 for securing the flange 30 and hence the annular track to the wheel 28. Said fastening means 31, in the form shown, comprise a plurality of threaded sleeves, one of which is shown at 32, and which is adapted for threadedly engaging a wheel stud 33 rigidly secured to such wheel 28, and for also engaging a bolt 34, the head of which urges the disc 30 toward the sleeve 32 in a well known manner.

One of the balance weight elements will now be described, it being understood that the other one, namely, 21, is of similar construction.

The balance weight element 20 aforementioned is constrained to move in the annular track or race 23 which has its center coincident with the center of rotation of the assembly being balanced, that is, the annular track 23 is situated in a plane normal to the axis of rotation of the assembly being balanced, such axis passing through the center of the circular track. Preferably, the plane of the circular track 23 is as near to the center of mass of the front wheel assembly (or other rotating body) as is practicable.

The balance weight element 20 is constituted by two weight subelements 35 and 36, the first of which is referred to as a sliding guide weight and is designed for the purpose of sliding movement upon the inner surface of the outer flange 24. The radially outermost surface of the weight subelement 35 is adapted for following such outer flange 24 and hence, at least in whole or in part, is of arcuate configuration. The other weight subelement 36 is mounted upon the first weight subelement for radial movement in response to centrifugal force, the connection between the two weight subelements occurring by virtue of the radially extending post 37 which, in the form shown, is perpendicular to the weight subelement 35 and hence radially of the annular track 23 and thus toward the center 38 thereof. The center 38 thereof has passing therethrough the axis 39 (Fig. 2) of the wheel 28, it being understood that the track 23 is normal to the axis 39.

The weight subelement 36 thus is radially movable with respect to the annular track 23 and is movable toward and away from the weight subelement 35 by virtue of the guiding action of the post 37. The weight subelement 36 is located between the aforementioned center 38 and the other weight subelement 35 and is urged toward such center by means of suitable resilient means, such as a coil spring 40 which surrounds the post 37 and at one extremity engages the aforementioned weight subelement 35 at the base of the post 37, and at the other extremity of such spring engages the weight subelement 36 to urge same inwardly and radially toward a detent surface 41 which is formed in the inner flange 25. The detent surface is designed for the purpose of coacting with the detent finger 42 which is rigidly connected to the weight subelement 36, as, for example, by a sleeve 36a coaxial with the post 37.

The mass of the weight subelement 36 and the strength of the spring 40 are selected and are constructed and arranged whereby centrifugal forces which occur, preferably slightly above the critical speed, are capable of overcoming the spring 40 and thereby permitting a disengagement of the detent finger 42 with the detent surface 41 and thus to free the balance weight elements 20 and 21 for repositioning upon the light side of the rotating shaft.

The detent surface 41, in the form shown (Figs. 1, 1a and 2) consists of a plurality of uniformly spaced recesses of perforations 43 formed in such inner flange 25 and adapted to receive the aforementioned detent finger 42. Thus the operation of the spring 40 is to urge the two weight subelements 35 and 36 apart in a radial direction, that is, when the balance weight element 20 is located in its annular race, the spring 40 (below the critical speed) moves the weight element in a fixed position relative to the track 23 because it urges the weight subelement 35 outwardly, and the other weight subelement radially inwardly whereby the detent finger 42 of the latter is able to engage one of the perforations or recesses 43, thereby positively to lock the balance weight element in such fixed position.

In operation, the novel balancing apparatus of Figs. 1, 1a and 2 is originally assembled preferably with the two balance weight elements 20 and 21 diametrically opposed so that when the rotating body is moving below its critical speed (and before it has been raised above such speed) such balance weights 20 and 21 will not contribute to the unbalance of the rotating body. However, when the rotating body, together with the counterbalance means affixed thereto (Fig. 2), is brought above its critical speed, the centrifugal forces acting upon the weight subelement 36 are sufficient to overcome the spring 40 to an extent to permit the detent finger 42 to become disengaged from the detent surface 41 and hence from the recesses 43 whereupon the balance weight element 20 (and also 21) is free to move within the annular track 23, for example, to assume new and balanced positions, for example, at 44 and 45, respectively, for counterbalancing the imbalance of the assembly. The degree of proximity to which the balance weight elements 20 and 21 can move is illustrated by the aforementioned positions 44 and 45. It will be noted that the angle 44, 38, 45 is 60°. However, the balance weight elements can move substantially closer to one another and in the form shown in Fig. 1 can move to new positions wherein the center lines thereof are approximately 30° apart. In the other forms of the invention shown in the drawings, that is, in the following embodiments: Figs. 3–6; Fig. 7 and 8; Figs. 11 and 12; and Figs. 13 and 14, the balance weight elements can move even closer to one another should this become necessary. For example, in the embodiments of Figs. 3–6 the minimum degree of proximity between center lines and the balance weight elements is of the order of 10° to 15°.

Thus the weights 20 and 21 are held in position by the spring 40 or other suitable resilient means at all rotating speeds below the natural frequency or critical speed of the body (in the present case, of the "front end assembly" of a front wheel of an automobile). However, at a predetermined speed above the critical speed of the assembly the centrifugal forces acting on the weight elements 20 and 21 overcomes the forces operating the detent means and permits the weight elements to move under the influence of natural forces which exist due to the imbalance of the rotating body. The weight elements 20 and 21 thus will move, under the influence of such natural forces existing, until all imbalance is counteracted and the rotating body and its assembly is in balance. When the rotational speed of the rotating body is reduced below the aforementioned speed (above the critical speed), the detents are again actuated to hold the weights in their new positions which they sought during the period of operation above such critical speed. Thus in operation thereafter the rotating body is in continual balance until there arises again a need for rebalancing or relocating the balance weight elements 20 and 21 whereupon the latter weight elements will become readjusted in position every time the rotating body is raised in speed above the aforementioned selected speed which is preferably slightly above the critical speed of rotation.

It is, of course, understood that the force of the spring 40 can be selected to permit radial movement of the subelement 36 at any selected rotational speed. However, the present invention envisions the redistribution of the balance weight elements at a speed slightly above the aforementioned critical speed.

In the form shown in Figs. 1, 1a and 2, the heavier of the two weight subelements 35 and 36 is, for example, the latter one, namely, subelement 36. However, the invention is not limited thereto, it being possible for the subelement 35 to be heavier or for said subelements to be equal in weight. It is, however, necessary for the mass of the subelement, which is centrifugally actuated to control the detent, to be selected in combination with the strength of the spring 40 to release the detent means at the aforementioned selected speed slightly above the critical speed. It is, of course, understood that a resilient suspension system for a wheel, whether front or rear of a vehicle, may influence the critical speed of such wheel.

A second form of the invention will now be described as shown in Figs. 3–6, inclusive. This form of the invention is substantially similar to the form described in Fig. 1 with the exception that the centrifugally responsive weight subelement is pivoted to the other weight subelement and a suitable spring or other resilient means is employed for urging such centrifugally responsive weight subelement toward the detent surface whereby the detent finger thereof can engage the recess in the detent surface.

Referring to Fig. 3, a balance weight element 46 thus will be described which consists of a primary weight 47 (a weight subelement) and a secondary weight 48 (also a weight subelement), the secondary weight 48 having a detent finger 49 suitably located thereupon in the form shown at the righthand extremity thereof (Fig. 3), the opposite extremity thereof being pivoted at 50 to the primary weight 47. The secondary weight 48, in the form shown, is in the configuration of a lever having arms 48a and 48b, such arms being substantially perpendicular and the former arm being pivoted at 50 aforementioned to the primary weight 47. Each of the weights, that is, the primary and secondary weights, are provided with suitable recesses 51 and 52 for the purpose of receiving a spring 53 which performs a function analogous to the above-described spring 40.

As in the above-described embodiment of Fig. 1, the detent finger 49 is constructed and arranged for engaging any one of the recesses or holes 43 formed in the detent surface 41.

One of the principal distinctions of the embodiment of Fig. 3 over that of Fig. 1 is that the centrifugal forces which act upon the secondary weight 48 act about the center of the pivot 50. Hence the spring 53 is designed for counteracting a moment of forces rather than forces which act directly radially as in Fig. 1.

Thus in the embodiment of Figs. 3–6, the mass of the secondary weight 48 and the strength of the spring 53 and the location of the pivot 50 are selected to produce a moment in response to a centrifugal force acting slightly above the critical speed which is capable of compressing the spring 53 and thus overcoming same and permitting the secondary weight to assume the position shown in Fig. 5 whereby the detent finger 49 is disengaged from the hole 43 thereby to free the balance weight element 46 for repositioning as demanded by the forces of unbalance occurring above the critical speed.

In operation, preferably two balance weight elements, such as 46, are positioned diametrically opposed to one another, that is, in positions initially similar to the initial positions of the balance weight elements 20 and 21 of Fig. 1 and the balancing device is affixed to the rotating body whereby the annular track is coaxial with the axis of rotation of the rotating body, whatever it may be, and the combination of the rotating body and the automatic balancing device are rotated above the critical speed of the combination. At a selected speed above such critical speed the centrifugal forces acting upon the secondary weights 48 are sufficient to compress the springs 53 upon both of such balance weight elements 46 whereupon they are free to move to the light side of the rotating shaft, for example, again to the positions 44 and 45. Thus centrifugal force overcomes the force of the springs 53 at some predetermined speed above the critical or resonant speed, and within the annular track means the balance weight elements move, as aforementioned, to the desired positions. Below the predetermined or selected speed (and still above the critical speed), the force of the springs 53 is greater than the aforementioned centrifugal force or greater than the moment acting about the pivot 50 and hence is capable of actuating the detent means and forcing the detent fingers 49 into one of the recesses 43.

Referring now to the embodiment of Figs. 7 and 8, a third form of the invention will be described which is similar in principle of operation to that above described with the exception that, instead of employing a track means which encloses the balance weight elements, a single annular flange is employed which protrudes into a slot formed in each of the balance weight elements and the latter are constructed and arranged for movement about the annular flange. Thus an annular flange 54 is employed which preferably is an integral portion of a frame 55, the latter rotating about the axis of rotation 38. Preferably the flange 54 is cylindrical in conformation and is provided with a lip 56 upon the righthand margin of the outer surface 57a thereof, as is well shown in Fig. 8, such lip 56 having a single interruption or slot 57 for the purpose of receiving and permitting the installation of a pair of balance weight elements, one of which is shown at 58, embodying the new form thereof as shown in Fig. 7. Each balance weight element 58 consists of a primary weight 59 which in transverse cross-section is provided with a slot 60 conformed to receive the flange 54 and hence of arcuate configuration as viewed in a plane perpendicular to that of Fig. 7. An inner surface 57b of the flange 54 is adapted for coacting with a surface 59b of the weight 59, these two surfaces fitting one another and being slidable relative to one another.

The detent means for the embodiment of Fig. 7 comprise a centrifugally responsive secondary weight 61 having a detent finger 62. The secondary weight 61 fits within a recess 63 formed within the weight 59 and is axially slidable therein and is urged radially inwardly by means of a spring 64 which is interposed between the radially outermost surface of the recess 63 and the innermost surface of a recess central 65 formed in the secondary weight 61. Thus the spring 64 urges the detent finger 62 towards the surface 57a which constitutes a detent surface and is provided with a plurality of detent recess or holes 66 which are analogous to the holes 43 of Fig. 1.

As is well shown in Fig. 7, the extent of the retaining lip 56 is relatively small, it being located upon the righthand margin of the flange 54 thereby to prevent the detachment of the balance weight elements 58 except through the slot or interruption 57 (Fig. 8).

The operation of the embodiment of Figs. 7 and 8 is substantially similar to that described in connection with the embodiment of Fig. 1 with the exception that the surface 59b of the primary weight 59 slides upon the inner surface 57b of the flange 54 after the detent 62 has become disengaged from the recess 66 in response to centrifugal force.

Referring to Fig. 9, there is illustrated the combination of the novel balancing apparatus embodying the present invention with the brake drum of a wheel of an automotive vehicle. Such wheel is shown at 67 having a tire rim 68 and a brake drum 69. A brake shoe 70 coacts with the brake drum 69 and the latter may be provided with suitable heat dissipating surfaces which normally are radially disposed thereto, for example, as shown at 71. Inner and outer flanges of the annular track means are also associated with the brake drum at 72 and 73 which are analogous to the inner and outer flanges 24 and 25 of Fig. 1a. However, the flanges 72 and 73 may assist in dissipating the heat incidental to the braking of the vehicle by virtue of their juxtaposition thereto. The inner and outer flanges 72 and 73 are parts of an annular track means 74 in which may be situated the pair of balance weight elements, for example, 20, 21 or 46, 46. The inner flange 73 may be provided with a detent surface 75 comprising a plurality of recesses which may be in the form of rectangular grooves 76 which may be either cast or pressed into the sheet metal forming the inner flange 73. It is, of course, understood that the brake drum 67 is suitably rigidly attached to the wheel 67 by well known means whereby the two rotate together as an integral assembly.

In the embodiment shown in Fig. 9, it is, of course, understood that the track means or race for guiding the balance weight element is suitably sealed. Within such race there may be employed, if desired, a suitable lubricant, such as a grease. The lubricity of the latter may be increased by the heat generated by the brakes when applied thereby facilitating the movement of the balance weight elements when released as aforementioned.

It will be noted that in connection with all of the three embodiments heretofore described, the spring or resilient means associated with one of the weight subelements is effective to urge same toward a detent surface and to lock the balance weight element in a fixed position upon the annular track means and that such resilient means or spring is overcome in response to centrifugal force every time a selected speed is reached which, as aforementioned, is preferably somewhat above the critical speed. Hence there can be a rebalancing of the rotating body every time such speed is reached. That is, every time there is a change in the balance conditions of the rotating body. This may be caused, for example, by a change in the configuration of a tire which may be mounted upon the tire rim 68 of Fig. 9 or upon the tire rim 28a of Fig. 1. Such change in configuration or weight distribution may be brought about, for example, by excessive braking action causing an abrasion and loss of the rubber on the periphery of the tire. Thus there is a movement in a radial direction of each of the movable weight subelements of the embodiments of Figs. 1, 3 and 7 towards and away from the center 38 each time a centrifugal force occurs adequate for such movements. However, in the embodiment of Figs. 11 and 12, once the detent means has become actuated, it locks the balance weight element in a counterbalancing position and will not again automatically rebalance unless manually adjusted therefor as will appear below.

There will now be described a fourth embodiment of the present invention as shown in Fig. 11 and a separate and non-equivalent modification thereof as shown in Fig. 12.

Referring now to Fig. 11, the aforementioned fourth form of the invention includes a balance weight element 77 consisting of a primary weight 78 and a secondary weight 79, these elements also being referred to as a first weight subelement and a second weight subelement. The balance weight element 77 is constructed and arranged for movement within an annular track or race means 80 and, as in the case of the other embodiments heretofore described, usually at least two of such balance weight elements are employed. However, only one will be described, namely, that designated above at 77. The annular track means 80 are provided with an inner flange 81 and an outer flange 82 which are closely adjacent the inner and outer surfaces 78a and 78b of the primary weight 78. Hence a distinction exists in this embodiment as compared to those aforedescribed in that the primary weight 78 is held in place in the annular track means 80 without the aid of the secondary weight 79, this occurring by virtue of the proximity of the surfaces of the inner and outer flanges 81 and 82 with the inner and outer coacting surfaces 78a and 78b of the primary weight 78.

The detent means for the embodiment of Fig. 11 provides the aforementioned secondary weights 79 which is axially shiftable in a radial direction with a cylindrical recess 83 formed in the primary weight 78, it being understood that the secondary weight 79 is conformed to fit into such cylindrical recess and the secondary weight 79 is provided with a detent finger 84 adapted to coact with a detent surface 85 formed on the inner surface of the outer flange 82 and provided with a plurality of recesses or perforations or holes 86 into any one of which the detent finger 84 can be thrust by means of a spring 87.

The secondary weight 79 can be held in a withdrawn or inoperative position by means of a spring loaded detent 88 which may be effective below a selected speed (which preferably is slightly in excess of the aforementioned critical speed). The second detent means 88, in the form shown, comprise a small ball 89 which is axially shiftable within a passage 90 and urge to the left, as viewed in Fig. 7, by means of a second detent spring 91, thereby to force the ball 89 to the left. A coacting detent groove 92 is formed in the periphery of the secondary weight 79 for the purpose of coacting with the ball 89 for producing a detent action.

In operation of the form of the invention shown in Fig. 11, a plurality of the balance weight elements 77 are located within the annular track means 80 and the secondary weights 79 thereof are retracted in such manner that the ball 89 can coact with the groove 92 thereby resiliently to restrain the axial motion of the secondary weight 79. During this location of the secondary weight the primary weight 78 will be able to shift angularly within the annular track means freely. When the rotating body is brought to a selected speed, preferably slightly above a critical speed, due to the selection of the mass of the secondary weight 79 and the strength of the springs 87 and 91, the centrifugal force acting upon the secondary weight 79, together with the force of the spring 87, are effective to overcome the effect of the second detent means 88 thereby to release the secondary weight 79 and to permit the detent finger 84 to engage one of the recesses 86 whereby the balance weight element 77 is locked in a fixed position in the track 80. Thus centrifugal force of the piston-like secondary weight 79, plus the force of the spring 87, is capable of overcoming the second detent at the selected speed above the critical speed.

In the separate and non-equivalent modification shown in Fig. 12, the construction is identical to that shown in Fig. 11 with the exception that a secondary weight 93 is employed which is of piston-like configuration and similar to the weight 79 of Fig. 11 except that it has been provided with no detent finger and is adapted for engaging an inner surface 94 of an outer flange 95 of annular track means 96, such inner surface 94 not being provided with recesses, such as 86, but being without interruption. Hence the secondary weight 93 is adapted for frictionally engaging such surface 94. Such embodiment is well adapted for use, e.g., on an engine flywheel where no substantial external buffeting forces are normally encountered.

In operation of the form shown in Fig. 12, the piston-like secondary weight 93 moves radially outwardly under the influence of centrifugal force and the force of its spring 87 and holds the balance weight element in position by means of friction created as the result of centrifugal force and the force of such spring 87. After the cessation of rotation of the rotatable body undergoing balancing and to which the embodiment of Fig. 12 is secured, the weight may be secured in place as by a suitable metal stake.

Referring now to Fig. 13, there will be described a particular type of hub cap or wheel-cover for an automotive vehicle which has formed therein an annular race for any of the forms of balance weight elements above described with the exception of that of Fig. 7. The hub cap is generally designated at 97 and consists of two pieces 98 and 99 which preferably are formed by stamping and which are so constructed and arranged that an annular track or race 100 is formed for the balance weight element. For example, the stamped piece 98 may be conformed to comprise an outer flange 101 and a side flange 102 of the aforementioned annular track or race 100, and the other piece 99 of the hub cap can be stamped to form an inner flange 103 and another side flange 104 of such annular track. The two pieces 98 and 99 can be secured together as by welding or brazing at 105 and 106. The expressions "hub cap" and "wheelcover" are used synonymously herein.

For the purpose of inserting the balance weight elements into the annular track 100, a flap 107 may be temporarily bent into alignment with the inner flange 103 thereby providing an opening for such insertion and the balance weights may be inserted one at a time into such opening whereupon the flap 107 can be bent back in place and sealed against the influx of foreign matter. The inner surface of the inner flange 103 may be provided with rectangular slots for the purpose of acting as detent recesses thereby forming a detent surface for cooperating with a detent finger of the balance weight element in the annular track.

Referring to Fig. 14, a somewhat different type of hub cap or wheel-cover is employed to which the balancing device is secured as by brazing or spot welding. The expressions "hub cap" and "wheel cover" are herein used synonymously. Such hub cap may be of the single piece stamped variety designated at 108 and, for example, may be of bowl configuration or dish shaped and adapted in a well known manner to be secured to the vehicle wheel by suitable clamps or other connecting devices. Within the dished portion of the hub cap 108 an annular track or race 109 is positioned and is conformed to be easily secured as by the aforementioned brazing or spot welding to the inner dished surface of the hub cap. For example, the flaps 110 and 111 are provided which may be so secured to the inner surface of the hub cap thereby providing a closed annular track or race having an inner flange 112 which also may be provided with rectangular slots, the axes of which are substantially parallel to the axis of rotation of the hub cap and thus are substantially similar in shape and attitude to the rectangular slots of the form shown in Fig. 13. A suitable metal flap (not shown) may be bent downwardly in the manner similar to that shown and described in connection with Fig. 13 whereby the balance weight elements may be inserted into the annular track or race 109 and the flap again bent upwardly to prevent the escape of same.

In the forms of the balance weight elements above described, the peripheries thereof have been shown as conformed to slide against the annular inner surface of the outer flange, such as 24 (Figs. 1, 1a, 3 and 5), without the aid of any antifriction means. If desired, such antifriction means can be employed, for example, the roller bearings 113 and 114 (Fig. 3), the axes of which are parallel to the axis of rotation of the rotating body. Where such roller bearings 113, 114 are employed, it is understood that the peripheral surface of the balance weight element will take the form 115 (Fig. 3).

In lieu of such roller bearings 113, 114 which are, of course, rotatable, suitable stationary integral ridges (not shown) may be employed thereby presenting a non-rotatable but relatively small surface to the coacting inner flange surface 24. Alternatively, in lieu of such roller bearings or integral ridges, two or more spaced spherical bearings (not shown) may be employed as antifriction means between the aforementioned surfaces. For example, a pair of ball bearings may be employed situated on the center line of the peripheral surface of the balance weight element thereby to engage the inner surface of the outer flange.

In the above description of the invention only a single balancing device has been described including the annular track means for guiding the pair of balance weight elements. It is desirable for such single balancing device to be located as close as possible to the center of mass of the rotating body. However, for dynamic balancing purposes two such devices may be employed suitably situated in spaced relation on the axis of a rotating body. Where two of such balancing devices are so employed, they will perform the function of a dynamic balancer. The latter expression being employed in the usual sense thereof as set forth in the literature on this subject, for example, as in "Mechanical Vibrations" by Hartog (McGraw-Hill) 1940 edition.

There is thus provided a novel apparatus for automatically balancing a rotating body, which apparatus requires no manual adjustment or the addition of any further weights in view of the fact that the apparatus is a part of the rotating body to be balanced and independent of any external balancing device. The novel apparatus is extremely sensitive and rapid in its operation and the balance weights are positioned within a close tolerance in view of the fact that the balancing is done above the critical speed as a result of and by the unbalance forces themselves. Furthermore, the novel apparatus effects a balance of the rotating body, such as the vehicle wheel and its suspension system. The novel apparatus embodying the invention readjusts or rebalances the rotating body to adjust, for example, for tire wear, as in the case of an automotive vehicle, for spring sag and the like, every time the speed of the vehicle wheel is raised above the critical speed in ordinary use. Thus the combination of the novel apparatus of the vehicle wheel is kept in continual and perfect balance at all times.

Also the apparatus embodying the present invention maintains the balance once it is attained both above and below the critical speed for a given configuration of the rotating body to be balanced. There is a positive locking detent means which is resistant to external buffeting forces and is particularly well adapted for resisting the external buffeting forces acting upon a vehicle wheel which is subjected to violent road shocks. Thus the operation of the apparatus embodying the invention is dependent upon forces which occur above the critical speed and after such forces occur, the balance is achieved and maintained even below such speed. Thus there is an automatic rebalancing attained each time the critical speed is exceeded and a selected speed is reached for the actuation of the detent means. The annular or circular track means is coaxial at all times with the axis of rotation of the body to be balanced. Furthermore, the detent member, as exemplified by a movable secondary weight of a balance member, is part of the entire balance weight element and not a separate entity. That is, the detent member is movable not only away and toward the center or axis of rotation, but is movable angularly about such axis once the balance weight is freed for movement in the annular track.

The novel apparatus embodying the invention provides a non-slip detent for its balance weight which type of detent is essential in devices where external buffeting forces are of regularity and severity, such as those acting upon a vehicle wheel.

What is claimed is:

1. A balancing device for a rotatable body comprising an annular race element positionable coaxial with the axis of rotation of such body, a plurality of balance weight elements, each of such latter elements including a pair of masses, at least one of which masses is mounted for guidance by such race element and the other of which comprises a detent member mounted thereupon for movement relative thereto in response to centrifugal force, said race element including detent recesses, and spring means for urging said other mass toward such recesses, the weight of said detent member and the strength of said spring means both being selected for maintaining said detent member in engagement with a detent recess in response to rotation below the critical rotational speed of the masses being rotated including said rotatable body and balancing device and thus below the number of revolutions per unit time which corresponds to the resonant frequency of such masses, but permitting disengagement of such detent member and recesses in response to rotational speed above such critical speed.

2. A balancing device for a rotatable body comprising an annular race, a plurality of balance weight elements each of which includes a pair of masses mounted for movement together about such race and relative to one another, one of said masses being so movable relative to the other in response to centrifugal force, and resilient means for urging such last-mentioned mass radially of the axis of rotation of such body and toward engagement with a portion of such race, the weight of such last-mentioned mass and the strength of said resilient means both being selected for maintaining the aforementioned engagement of such mass and race below the critical speed of such balancing device and rotatable body but permitting disengagement thereof above such speed.

3. In a balancing device for a rotatable body, an annular element mounted for rotation substantially concentric with said body, a primary counterbalance weight, a secondary counterbalance weight, said weights being mounted for movement as a unit angularly about such axis guided by such annular element, said element having operatively associated therewith an annular detent surface having a plurality of recesses therein, one of said weights having a detent finger adapted for engaging any one of such recesses, and resilient means for urging the last mentioned of said weights toward said detent surface, the mass of such last-mentioned weight and the strength of such resilient means both being selected for maintaining engagement of said finger and a recess in response to rotation below the critical speed of such device and body but permitting disengagement thereof above such critical speed.

4. A balancing device for a rotatable body comprising: an annular guide element substantially concentric with the axis of rotation of said body, a plurality of balance weight elements, said annular guide element mounting said weight elements which are movable upon and guided thereby, means for releasably securing said balance weight elements in fixed position relative to said annular guide element, and centrifugally acuated means for controlling said weight element securing means, said centrifugally actuated means comprising a like plurality of weight subelements, one for each of said plurality of weight elements, each of said weight subelements being connected to its respective weight element for movement annularly therewith as guided by said annular guide element and also for movement relative to such respective balance weight element, a relatively fixed detent surface, and resilient means for urging each of said subelement weights toward said detent surface.

5. In a balancing device for a rotating body, a pair of counterbalance weight elements; a circular track for guiding such weight elements; such track defining a plane normal to the axis of rotation of such body, such axis passing through the center of the circle of such track; said circular track including a detent surface having a plurality of recesses therein and arranged along such track, each of such counterbalance weight elements including two subelement weights one of which is mounted for movement relative to the other in response to centrifugal force occurring when such track and weights are rotated about such axis, such last-mentioned subelement having a detent finger for engaging a recess of said detent surface, and resilient means for urging said last-mentioned subelement toward such engagement, the mass of such subelement weight mounted for movement in response to centrifugal force and the strength of such resilient means being selected for maintaining said detent finger in engagement with a recess of such detent surface below the critical rotational speed of the masses being rotated and thus below the number of revolutions per unit time which corresponds to the resonant frequency of such masses.

6. A balancing device for a rotatable body comprising a plurality of balance weight elements; a circular track for mounting and guiding such elements, said track being mounted coaxial with the axis of rotation of such rotatable body; detent means for releasably securing said weight elements in fixed position relative to said track, said detent means comprising a subelement portion of such balance weight element and a coacting detent surface having a plurality of recesses any one of which is engageable by such subelement portion, said subelement portion being mounted for movement relative to such detent surface in response to centrifugal force; and spring means for urging said subelement portion to move relative to such detent surface, the mass of such subelement which coacts with such detent surface and the strength of such spring means being selected for maintaining such subelement portion in engagement with one of such recesses at speeds below the critical speed, hence below the number of revolutions per unit time corresponding to the resonant frequency of the mass being rotated.

7. In a balancing device for a rotatable body, the combination including: an annular race element having an annular race coaxial with the axis of rotation of such body; said race element having formed therein a detent recess surface having a plurality of detent recesses therein spaced angularly about said axis of rotation; and a pair of balance weight elements mounted for guidance by said race, each of such balance weight elements including a first mass having a radially extending guide, detent means for such balance weight element including a second mass mounted by said radially extending guide and adapted for engaging said detent recess surface for releasably holding such balance element in a fixed position with respect to such race element, and resilient means for urging said second mass toward such recess surface, the latter surface being positioned whereby centrifugal force of a selected degree acting on such second mass can overcome the force of such resilient means thereby to disengage said detent means, such centrifugal force of selected degree comprising centrifugal force existing at and above the critical speed of the balancing device and rotatable body, the weight of such second mass and the strength of such resilient means being selected for maintaining said second mass in engagement with a detent recess below such critical speed but permitting disengagement above such speed.

8. A balancing device for a rotable body comprising: a plurality of balance weight elements for such body; a circular track for guiding such elements, the axis of rotation of such body passing through the center of such circular track and the plane of rotation of such track being positioned along such axis near the center of mass of such rotatable body and normal to such axis; said circular track having associated therewith a detent surface element including a plurality of recesses therein along such track; each of such balance weight elements including two subelements, one of which is pivoted upon the other for movement toward and away from such detent surface and which is provided with a detent finger for engaging one of such recesses; and resilient means for urging said last-mentioned subelement towards engagement with such detent surface element, such last-mentioned subelement and such resilient means being constructed and arranged for movement in response to centrifugal force acting thereon occurring above the critical angular speed of said rotatable body.

9. A balancing device for a rotatable body comprising an annular race element positionable coaxial with the axis of rotation of such body, a plurality of balance weight elements, each of such latter elements including a pair of masses, at least one of which is mounted for guidance by such race element and the other of which comprises a detent member mounted upon said first-mentioned mass for pivotal movement relative thereto in response to centrifugal force, said race element including detent recesses, and spring means for urging said second mass toward said recesses.

10. In combination with a rotatable vehicle wheel, an annular race secured to said wheel concentric with the axis of rotation thereof, such annular race having an inner flange and an outer flange, the latter comprising an annular detent surface having a plurality of recesses formed therein, a plurality of balance weight elements carried and guided by such race, each balance weight element consisting of two subelement weights, one of which is mounted for movement upon the other, spring means for urging such subelement weights to move relative to one another, one being urged radially of such axis of rotation and toward such detent surface thereby to form a first detent means, and second detent means for releasably securing said movably mounted subelement weight out of engagement with said detent surface.

11. In a balancing device for a vehicle wheel having a hub cap, an annular track element mounted upon said hub cap for rotation substantially concentric with said wheel, a primary counterbalance weight, a secondary counterbalance weight, said weights being mounted for movement as a unit angularly about such axis guided by such annular track element, said latter element having operatively associated therewith an annular detent surface having a plurality of recesses therein, one of said weights having a detent finger adapted for engaging any one of such recesses, and resilient means for urging the last mentioned of said weights and its finger toward said detent surface, the mass of said weight having the detent finger and the strength of said resilient means both being selected for maintaining in engagement said detent finger and a recess when below the resonant frequency of said vehicle wheel and balancing device and permitting disengagement thereof above such frequency.

12. A balancing device for a vehicle wheel having a hub cap comprising: an annular guide element substantially concentric with the axis of rotation of said wheel and secured to said hub cap, a plurality of counterbalance weight elements associated with said annular guide element whereby said weight elements are guided thereby, means for releasably securing said counterbalance weight elements in a fixed position relative to said annular guide element, and centrifugally actuated means for controlling said weight element securing means, said centrifugally actuated means comprising a like plurality of weight subelements, one for each of said plurality of weight elements, each of said weight subelements being secured to its respective weight element for movement annularly therewith and also being mounted for movement relative to said counterbalance weight element in response to centrifugal force, a detent surface, and resilient means for urging each of said subelement weights toward said detent surface, the mass of said movably mounted weight subelement and the strength of said resilient means both being selected for maintaining in engagement said subelement and detent surface when below the critical speed of said device and wheel and permitting disengagement thereof when above such speed.

13. In a balancing device for a vehicle wheel having in combination therewith a brake drum, an annular race element positioned coaxial with the axis of rotation of the wheel and mounted in heat transfer relation with such brake drum, a plurality of balance weight elements, each of such latter elements including a pair of masses, at least one of which is mounted for guidance by such race element and the other of which comprises a detent member mounted thereupon for movement relative thereto in response to centrifugal force, said race element including detent recesses, and spring means for urging said other mass toward such recesses, said race element being adapted for containing a lubricant which is influenced by such heat.

References Cited in the file of this patent

UNITED STATES PATENTS

| | | |
|---|---|---|
| 1,158,712 | Nichols | Nov. 2, 1915 |
| 2,331,756 | Zobel | Oct. 12, 1943 |
| 2,336,920 | Bearman | Dec. 14, 1943 |